(12) United States Patent
Styles et al.

(10) Patent No.: US 9,476,345 B2
(45) Date of Patent: Oct. 25, 2016

(54) ENGINE COOLING FAN TO REDUCE CHARGE AIR COOLER CORROSION

(71) Applicant: Ford Global Technologies, LLC, Dearborn, MI (US)

(72) Inventors: Daniel Joseph Styles, Canton, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 512 days.

(21) Appl. No.: 13/656,471

(22) Filed: Oct. 19, 2012

(65) Prior Publication Data

US 2014/0109846 A1  Apr. 24, 2014

(51) Int. Cl.

| F02M 25/10 | (2006.01) |
|---|---|
| F02M 15/00 | (2006.01) |
| F01P 7/02 | (2006.01) |
| F01P 7/10 | (2006.01) |
| F01P 7/04 | (2006.01) |
| F01P 7/08 | (2006.01) |

(Continued)

(52) U.S. Cl.
CPC .. *F01P 7/04* (2013.01); *F01P 7/08* (2013.01); *F02B 29/0431* (2013.01); *F02B 29/0493* (2013.01); *F02D 23/00* (2013.01); *F02D 41/0007* (2013.01); *F02M 35/1038* (2013.01); *F01P 2025/52* (2013.01); *F02D 41/0065* (2013.01); *F02D 2200/021* (2013.01); *F02D 2200/0418* (2013.01); *F02M 26/06* (2016.02); *F02M 26/23* (2016.02); *Y02T 10/144* (2013.01); *Y02T 10/146* (2013.01)

(58) Field of Classification Search
CPC ............ F02B 29/0443; F02B 29/0475; F02B 29/0493; F02M 25/0707; F02M 25/0737; F02M 25/0731; F02M 1/00; F02M 2700/4321; F02M 25/022
USPC ........................ 123/41.12, 542, 41.49, 41.65
See application file for complete search history.

(56) References Cited

U.S. PATENT DOCUMENTS 5,213,066 A * 5/1993 Sausner .................... F01P 3/22
123/41.2
6,301,887 B1  10/2001 Gorel et al.
(Continued)

FOREIGN PATENT DOCUMENTS

EP   1918546 A1   5/2008
WO  9219851 A2  11/1992
(Continued)

OTHER PUBLICATIONS

Glugla, Chris Paul, "Charge Air Cooler Condensation Control," U.S. Appl. No. 13/621,696, filed Sep. 17, 2012, 33 pages.
(Continued)

*Primary Examiner* — Lindsay Low
*Assistant Examiner* — Syed O Hasan
(74) *Attorney, Agent, or Firm* — Julia Voutyras; Alleman Hall McCoy Russell & Tuttle LLP

(57) ABSTRACT

Methods and systems are provided for reducing corrosion of a charge air cooler and preventing engine misfire due to condensate formation. In response to condensate forming in a charge air cooler, engine cooling fan operation is adjusted. Engine cooling fan operation may also be controlled in response to vehicle operating conditions.

19 Claims, 9 Drawing Sheets

(51) Int. Cl.
*F02M 35/10* (2006.01)
*F02B 29/04* (2006.01)
*F02D 23/00* (2006.01)
*F02D 41/00* (2006.01)

(56) References Cited

U.S. PATENT DOCUMENTS

| | | | |
|---|---|---|---|
| 6,367,256 B1 | 4/2002 | McKee | |
| 6,408,831 B1 | 6/2002 | Craig et al. | |
| 6,681,171 B2 * | 1/2004 | Rimnac | F02B 29/0418 123/568.22 |
| 7,143,580 B2 * | 12/2006 | Ge | F02B 29/0418 123/563 |
| 7,424,868 B2 | 9/2008 | Reckels et al. | |
| 7,533,651 B2 | 5/2009 | Surnilla | |
| 7,685,816 B2 * | 3/2010 | Yabuki | F01P 7/044 60/456 |
| 7,707,991 B2 | 5/2010 | Miyanaga et al. | |
| 7,757,678 B2 * | 7/2010 | Marsh | F02B 29/0425 123/568.12 |
| 7,886,724 B2 | 2/2011 | Tai et al. | |
| 8,020,536 B2 | 9/2011 | Kardos | |
| 2003/0217733 A1 | 11/2003 | Shiraishi et al. | |
| 2006/0095178 A1 | 5/2006 | Guilfoyle et al. | |
| 2010/0078001 A1 | 4/2010 | Kolmanovsky et al. | |
| 2011/0053735 A1 | 3/2011 | Lewis et al. | |
| 2011/0094219 A1 | 4/2011 | Palm | |
| 2011/0094482 A1 | 4/2011 | Weber et al. | |
| 2011/0137530 A1 * | 6/2011 | Kerns | 701/49 |
| 2011/0246023 A1 | 10/2011 | Lockwood et al. | |
| 2011/0303187 A1 | 12/2011 | Sasaki | |
| 2012/0158228 A1 | 6/2012 | Biondo et al. | |

FOREIGN PATENT DOCUMENTS

| | | |
|---|---|---|
| WO | 2007126372 A1 | 11/2007 |
| WO | 2010090866 A2 | 8/2010 |

OTHER PUBLICATIONS

Glugla, Chris Paul, "Charge Air Cooler Condensate Purging Cycle," U.S. Appl. No. 13/658,854, filed Oct. 10, 2012, 62 pages.

Glugla, Chris Paul et al., "Condensation Control in a Charge Air Cooler by Controlling Charge Air Cooler Temperature," U.S. Appl. No. 13/664,248, filed Oct. 30, 2012, 49 pages.

Styles, Daniel Joseph et al., "Charge Air Cooler (CAC) Corrosion Reduction Utilizing Grille Shutters," U.S. Appl. No. 13/656,524, filed Oct. 19, 2012, 33 pages.

Surnilla, Gopichandra et al., "Engine Control Coordination with Grille Shutter Adjustment and Ambient Conditions," U.S. Appl. No. 13/656,542, filed Oct. 19, 2012, 33 pages.

Glugla, Chris Paul et al., "Engine Control System and Method," U.S. Appl. No. 13/656,560, filed Oct. 19, 2012, 50 pages.

Glugla, Chris Paul et al., "Engine Control System and Method," U.S. Appl. No. 13/656,567, filed Oct. 19, 2012, 49 pages.

Glugla, Chris Paul et al., "Method for Purging Condensate from a Charge Air Cooler," U.S. Appl. No. 13/656,511, filed Oct. 19, 2012, 48 pages.

* cited by examiner

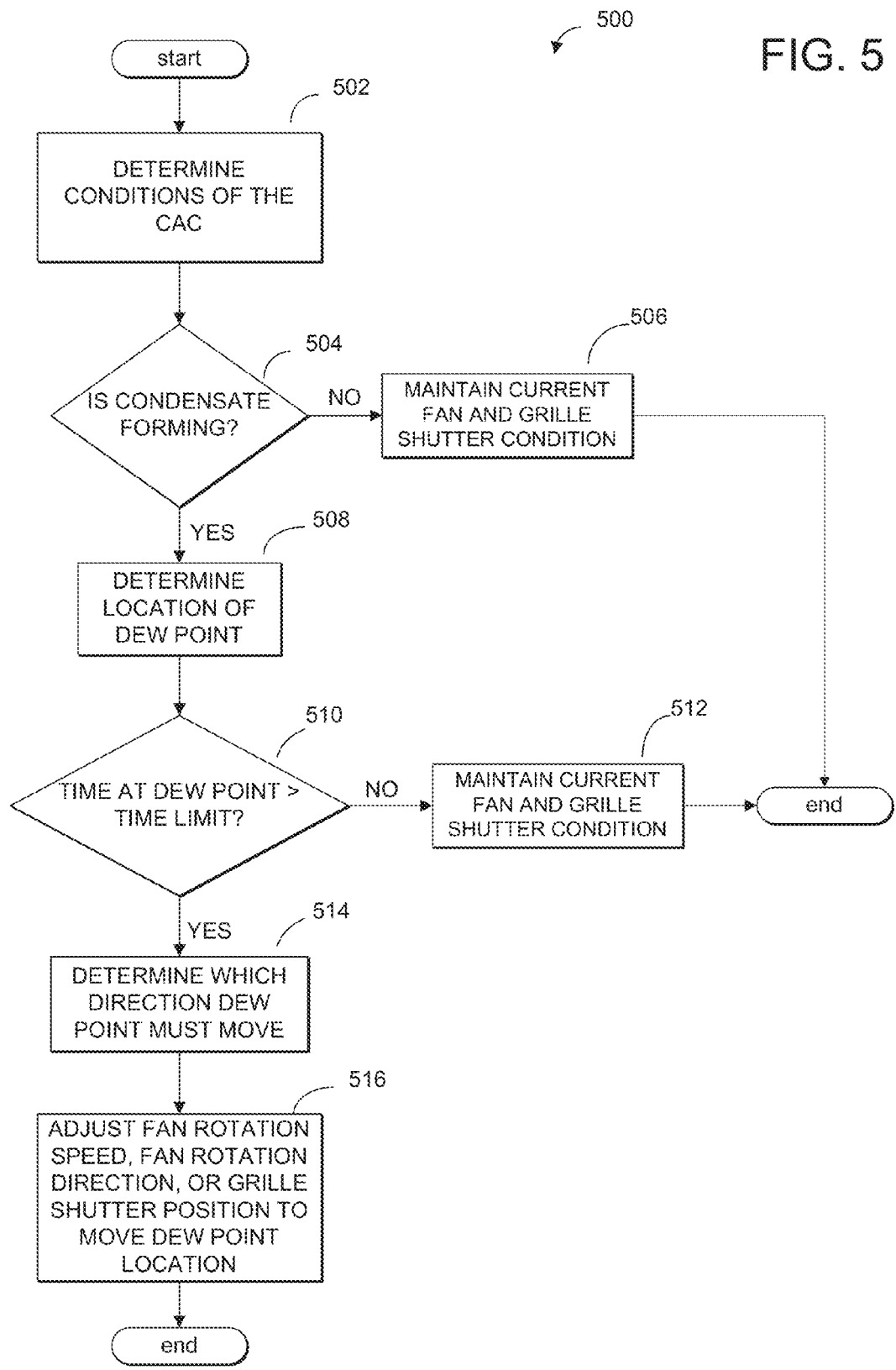

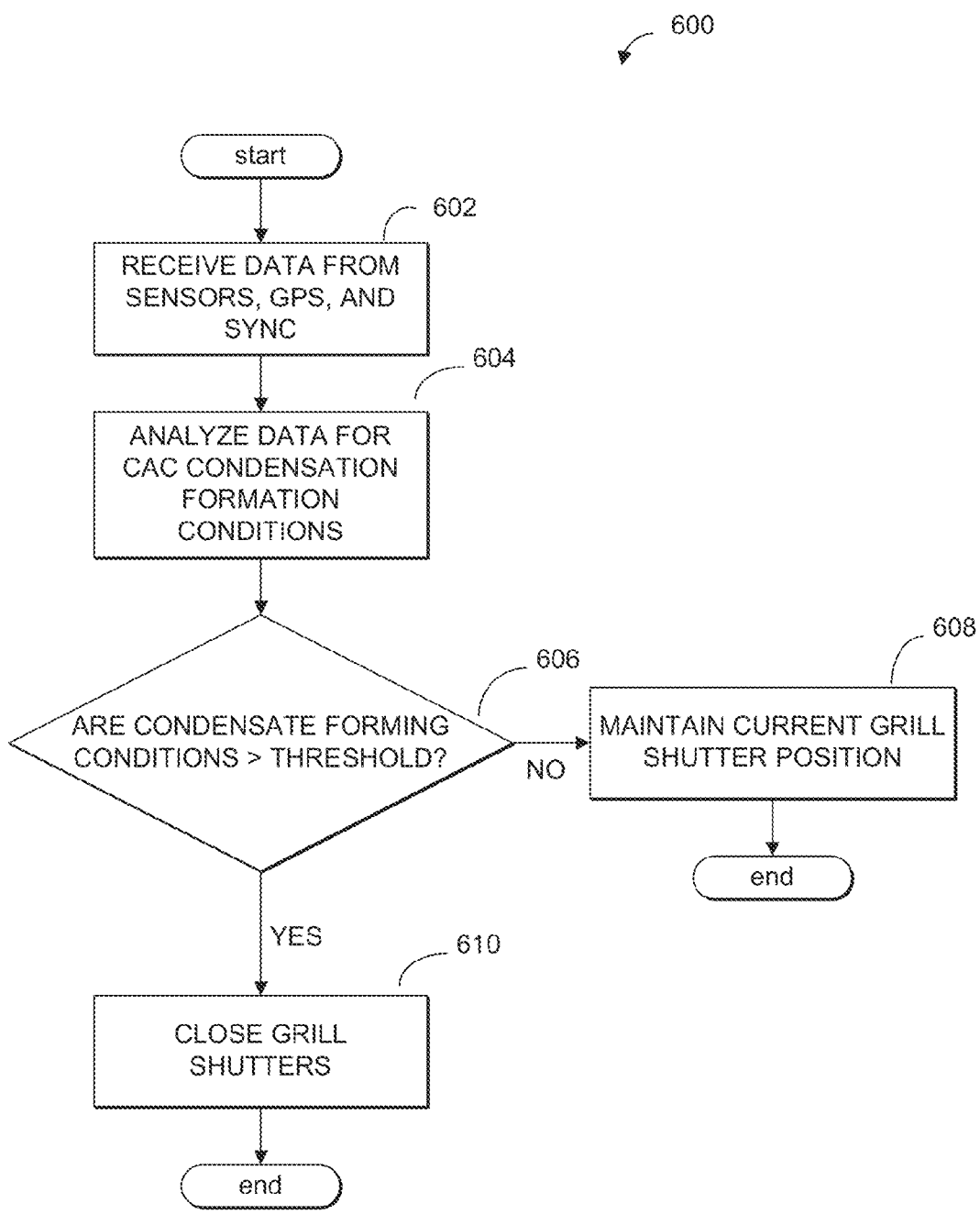

| MODE | FAN | GRILLE SHUTTERS |
|---|---|---|
| 1 | ON | OPEN |
| 2 | ON | CLOSED |
| 3 | OFF | OPEN |
| 4 | OFF | CLOSED |

ENGINE COOLING FAN TO REDUCE CHARGE AIR COOLER CORROSION

BACKGROUND/SUMMARY

Turbo charged engines utilize a Charge Air Cooler (CAC) to cool compressed air from the turbocharger, before it enters the engine. Ambient air from outside the vehicle travels across the CAC to cool intake air passing through the inside of the CAC. Condensate may form in the CAC when the ambient air temperature decreases, or during humid or rainy weather conditions, where the intake air is cooled below the water dew point. When the intake air includes recirculated exhaust gasses, the condensate can become acidic and corrode the CAC housing. The corrosion can lead to leaks between the air charge, the atmosphere, and possibly the coolant in the case of water-to-air coolers. Condensate may collect at the bottom of the CAC, and then be drawn into the engine at once during acceleration (or tip-in) increasing the chance of engine misfire.

Other attempts to address condensate formation include restricting intake air travelling through the CAC or restricting ambient air flow to the CAC. One example approach is shown by Craig et al. in U.S. Pat. No. 6,408,831. Therein, the intake air temperature is controlled by an ambient air flow restriction system and an intake air flow restriction system. A controller defines the position of these restriction devices and is connected to a plurality of sensors which measure different variables such as ambient air and intake air temperatures.

However, the inventors herein have recognized potential issues with such systems. Specifically, the above control of restriction devices in response to intake or ambient air temperature may reduce the overall level of condensate, while potentially increasing the concentration of acid in the condensate that does form. Maintaining temperatures at a certain level such that condensate formation is low may result in sustaining a flow restriction for a period of time. This keeps the CAC effectiveness at one level, causing the dew point to hover at one location in the CAC. This may result in an increased acid concentration at one location, actually creating a higher corrosion risk. This is because the corrosion risk is most severe at the location in the CAC where the charge air temperature drops below the dew point and water begins to condense, creating the highly concentrated water and acid solution, especially if the level of condensate is kept low.

In one example, the issues described above may be addressed by a method for controlling a vehicle engine cooling fan, comprising: adjusting fan rotation speed or rotation direction in response to a condensate location in a charge air cooler remaining within a positional range for greater than a threshold duration. The fan may be adjusted to move the condensate location toward an inlet of the charge air cooler (e.g., increase rotation speed) during a first set of conditions, and may be adjusted to move the condensate location toward an outlet of the charge air cooler (e.g., decrease rotation speed or turn rotation off) during a second, different, set of conditions. In this way, by moving the location of the condensate formation in the charge air cooler, e.g., back and forth within the charge air cooler, if the location becomes stagnant, it is possible to reduce corrosion risk at any given location from the inlet to the outlet of the charge air cooler, as one example.

In addition to condensate formation, the engine cooling fan may be adjusted in response to engine cooling parameters, outside weather conditions, and non-driven vehicle conditions, such as deceleration. Adjustment of the engine cooling fan may be coordinated with grille shutter operation in order to optimize condensate control, as well as engine cooling and fuel economy. For example, the inventors herein have identified approaches that enable the engine cooling fan and grille shutters to still be adjusted in a way that improves fuel economy (by reducing drag), but that also maintains engine coolant temperature control to avoid over temperature and reduces condensate formation.

Specifically, it may be possible to pre-cool the engine coolant during a deceleration by opening the grille shutters and turning on the engine cooling fan so that a subsequent acceleration operation can maintain the grille shutters closed for a longer duration, without resulting in over temperature conditions of the coolant. However, such pre-cooling operation may also exacerbate the potential for condensate formation, as the charge air cooler may be cooled to a greater extent. Therefore, in one example, the engine cooling fan speed or direction may be changed responsive to condensate formation during the deceleration condition.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows a flow chart of a method for controlling an engine cooling fan and adjusting grille shutter position based on condensate formation within the CAC.

FIG. 6 shows a flow chart of a method for adjusting grille shutter position based on condensate forming conditions determined from outside weather conditions.

DETAILED DESCRIPTION

The following description relates to systems and methods for adjusting a vehicle engine cooling fan in response to engine cooling parameters, condensate formation in a CAC, and non-driven vehicle conditions. Engine cooling fan operation may be coordinated with grille shutter operation for a vehicle engine system, such as the engine system in FIG. 1, to increase engine cooling, reduce condensate formation in the CAC, and optimize vehicle fuel economy. Opening of the grille shutters, such as those shown in FIG. 2, increases air flow through the vehicle front end, supplying cooling air flow to a radiator and CAC. Adjusting engine cooling fan operation further alters air flow to the CAC. Modifying the speed or rotation direction of the engine cooling fan may change the efficiency of the CAC by moving the dew point location (such as shown in FIG. 3), thus reducing corrosion. An engine controller may be configured to perform a control routine, such as the routines of FIG. 4-6, to adjust the engine cooling fan state based on a non-driven vehicle condition, condensate formation in the CAC, outside weather conditions, and engine temperatures. In this way, condensate formation, CAC corrosion, and engine misfire may be reduced. Example engine cooling fan operations in response to engine coolant temperature, vehicle speed, condensate formation, and outside weather conditions are described with reference to FIG. 7.

Figure 1:
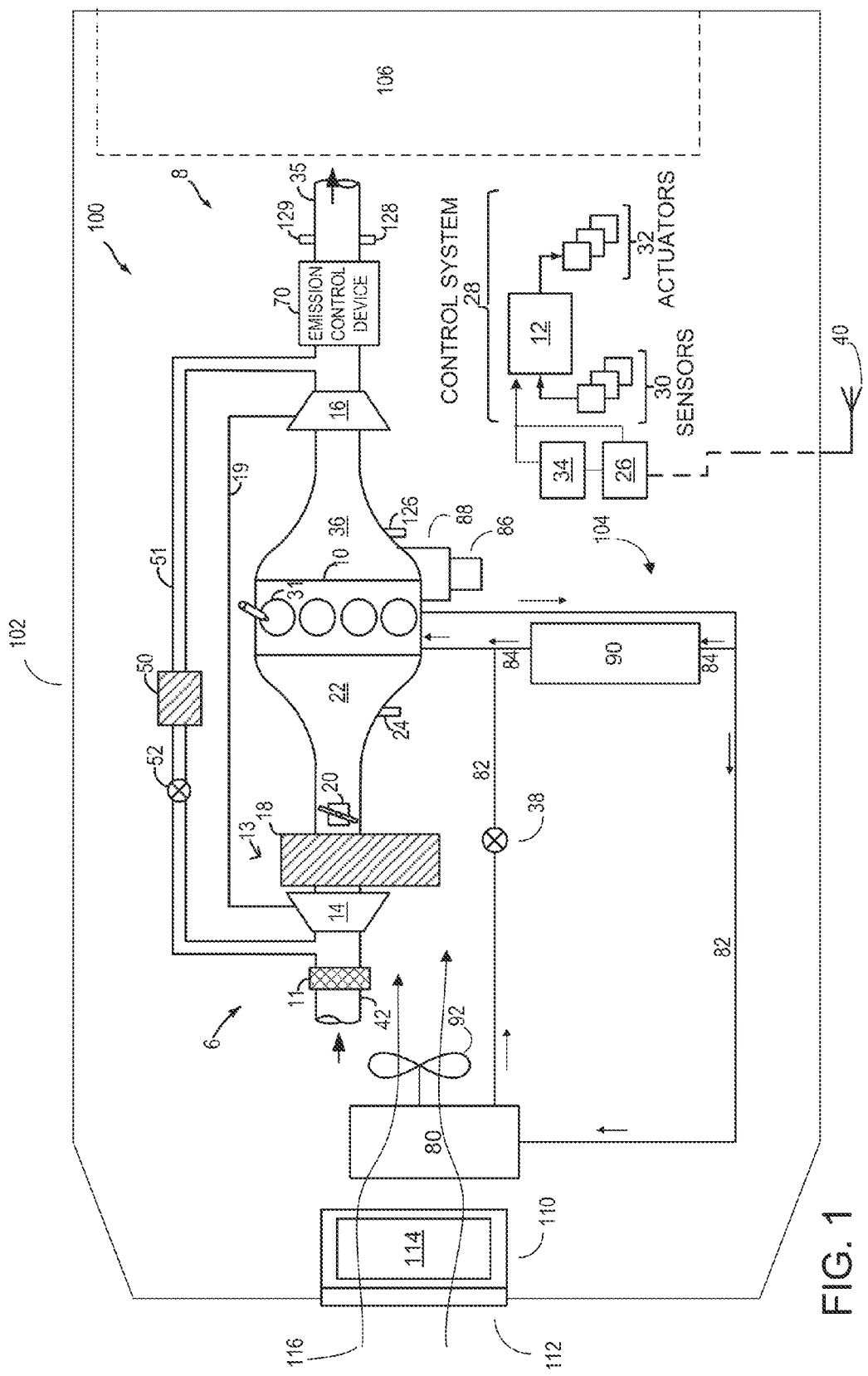
FIG. 1 shows a schematic diagram of a grille shutter system, engine cooling fan system, engine, and associated components in a vehicle.

FIG. 1 shows an example embodiment of a grille shutter system 110 and an engine system 100, in a motor vehicle 102, illustrated schematically. Engine system 100 may be included in a vehicle such as a road vehicle, among other types of vehicles. While the example applications of engine system 100 will be described with reference to a vehicle, it should be appreciated that various types of engines and vehicle propulsion systems may be used, including passenger cars, trucks, etc.

In the depicted embodiment, engine 10 is a boosted engine coupled to a turbocharger 13 including a compressor 14 driven by a turbine 16. Specifically, fresh air is introduced along intake passage 42 into engine 10 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve 20. Throttle valve 20 is coupled to engine intake manifold 22. From the compressor, the compressed air charge flows through the charge air cooler and the throttle valve to the intake manifold. The charge air cooler may be an air-to-air or air-to-water heat exchanger, for example. In the embodiment shown in FIG. 1, the pressure of the air charge within the intake manifold is sensed by manifold air pressure (MAP) sensor 24. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers 31 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 14. In this manner, the compressor is configured to admit exhaust tapped from downstream of turbine 16. The EGR valve may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and improved performance.

Motor vehicle 102 further includes a cooling system 104 that circulates coolant through internal combustion engine 10 to absorb waste heat and distributes the heated coolant to radiator 80 and/or heater core 90 via coolant lines 82 and 84, respectively. In particular, FIG. 1 shows cooling system 104 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via belt, chain, etc. Specifically, engine-driven water pump 86 circulates coolant through passages in the engine block, head, etc., to absorb engine heat, which is then transferred via the radiator 80 to ambient air. In an example where engine-driven water pump 86 is a centrifugal pump, the pressure (and resulting flow) produced may be proportional to the crankshaft speed, which in the example of FIG. 1, is directly proportional to engine speed. In another example, a motor-controlled pump may be used that can be adjusted independently of engine rotation. The temperature of the coolant may be regulated by a thermostat valve 38, located in the cooling line 82, which may be kept closed until the coolant reaches a threshold temperature.

Further, an engine cooling fan 92 may be coupled to radiator 80 in order to maintain airflow through radiator 80 when vehicle 102 is moving slowly or stopped while the engine is running. Fan rotation speed or direction may be controlled by a controller 12 described in more detail hereafter. Alternatively, engine cooling fan 92 may be coupled to the engine accessory drive system, driven by the engine crankshaft.

Coolant may flow through coolant line 82, as described above, and/or through coolant line 84 to heater core 90 where the heat may be transferred to passenger compartment 106, and the coolant flows back to engine 10. In some examples, engine-driven water pump 86 may operate to circulate the coolant through both coolant lines 82 and 84.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input, brake input, transmission selector position, vehicle speed, engine speed, mass airflow through the engine, ambient temperature, ambient humidity, intake air temperature, fan speed, etc.), cooling system sensors (such as coolant temperature, fan speed, passenger compartment temperature, ambient humidity, etc.), CAC 18 sensors (such as CAC inlet air temperature and pressure, CAC outlet air temperature and pressure, etc.), and others. In addition, controller 12 may receive data from the GPS 34 and/or an in-vehicle communications and entertainment system 26 of vehicle 102.

The in-vehicle communications and entertainment system 26 may communicate with a wireless communication device 40 via various wireless protocols, such as wireless networks, cell tower transmissions, and/or combinations thereof. Data obtained from the in-vehicle communications and entertainment system 26 may include real-time and forecasted weather conditions. Weather conditions, such as temperature, precipitation (e.g., rain, snow, hail, etc.), and humidity, may be obtained through various wireless communication device applications and weather-forecasting websites. Data obtained from the in-vehicle communications and entertainment system may include current and predicted weather conditions for the current location, as well as future locations along a planned travel route. In one embodiment, where the in-vehicle communications and entertainment system includes a GPS, current and future weather data may be correlated with current and future travel routes displayed on the GPS. In an alternate embodiment, wherein the vehicle system includes a dedicated GPS 34, each of the GPS and the in-vehicle communications and entertainment system may communicate with the wireless communication device 40, as well as with each other, to communicate current and future weather data with current and future travel routes. In one example, the entertainment system may access various weather maps stored on the internet or other cloud computing systems. The stored weather maps may include rain, humidity, precipitation and/or temperature information provided as contour maps, for example. In one example, the wireless communication device 40 may relay real-time humidity data to the in-vehicle communications and entertainment system 26, and/or GPS 34, which is then relayed to the controller 12. The controller 12 compares the received humidity data to threshold values and determines the appropriate engine cooling fan and grille shutter adjustment. For example, if humidity is greater than a defined threshold, one or more of the grille shutters may be closed and the engine cooling fan may be turned off.

Furthermore, controller 12 may communicate with various actuators 32, which may include engine actuators (such as fuel injectors, an electronically controlled intake air throttle plate, spark plugs, etc.), cooling system actuators (such as air handling vents and/or diverter valves in the passenger compartment climate control system, etc.), and others. In some examples, the storage medium may be programmed with computer readable data representing instructions executable by the processor for performing the methods described below as well as other variants that are anticipated but not specifically listed.

As noted herein, the amount of waste heat transferred to the coolant from the engine may vary with operating conditions, thereby affecting the amount of heat transferred to the airflows. For example, as engine output torque, or fuel flow, is reduced, the amount of waste heat generated may be proportionally reduced.

Motor vehicle 102 further includes a grille 112 providing an opening (e.g., a grille opening, a bumper opening, etc.) for receiving air flow 116 through or near the front end of the vehicle and into the engine compartment. Such air flow 116 may then be utilized by radiator 80, engine cooling fan 92, and other components to keep the engine and/or transmission cool. Further, the air flow 116 may reject heat from the vehicle air conditioning system and can improve performance of turbo-charged/super-charged engines that are equipped with CAC 18 that reduces the temperature of the air that goes into the intake manifold/engine. The engine cooling fan 92 may be adjusted to further increase or decrease the air flow to the engine components. Furthermore, a dedicated CAC fan may be included in the engine system and used to increase or decrease air flow to the CAC.

Figure 2:
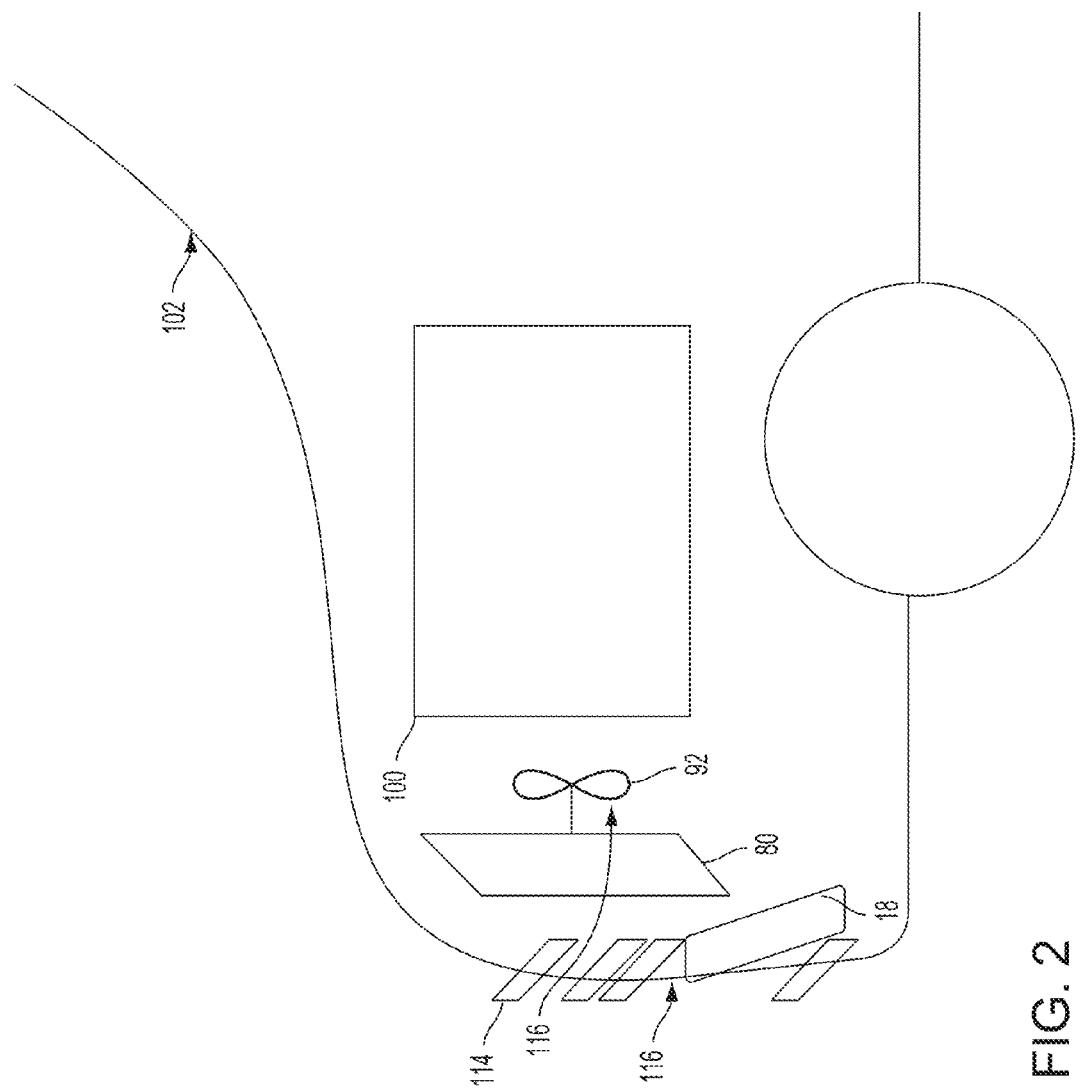
FIG. 2 shows an example of the CAC, radiator, engine cooling fan, and engine location within a vehicle with respect to the grille shutters and associated ambient air flow.
Figure 3:
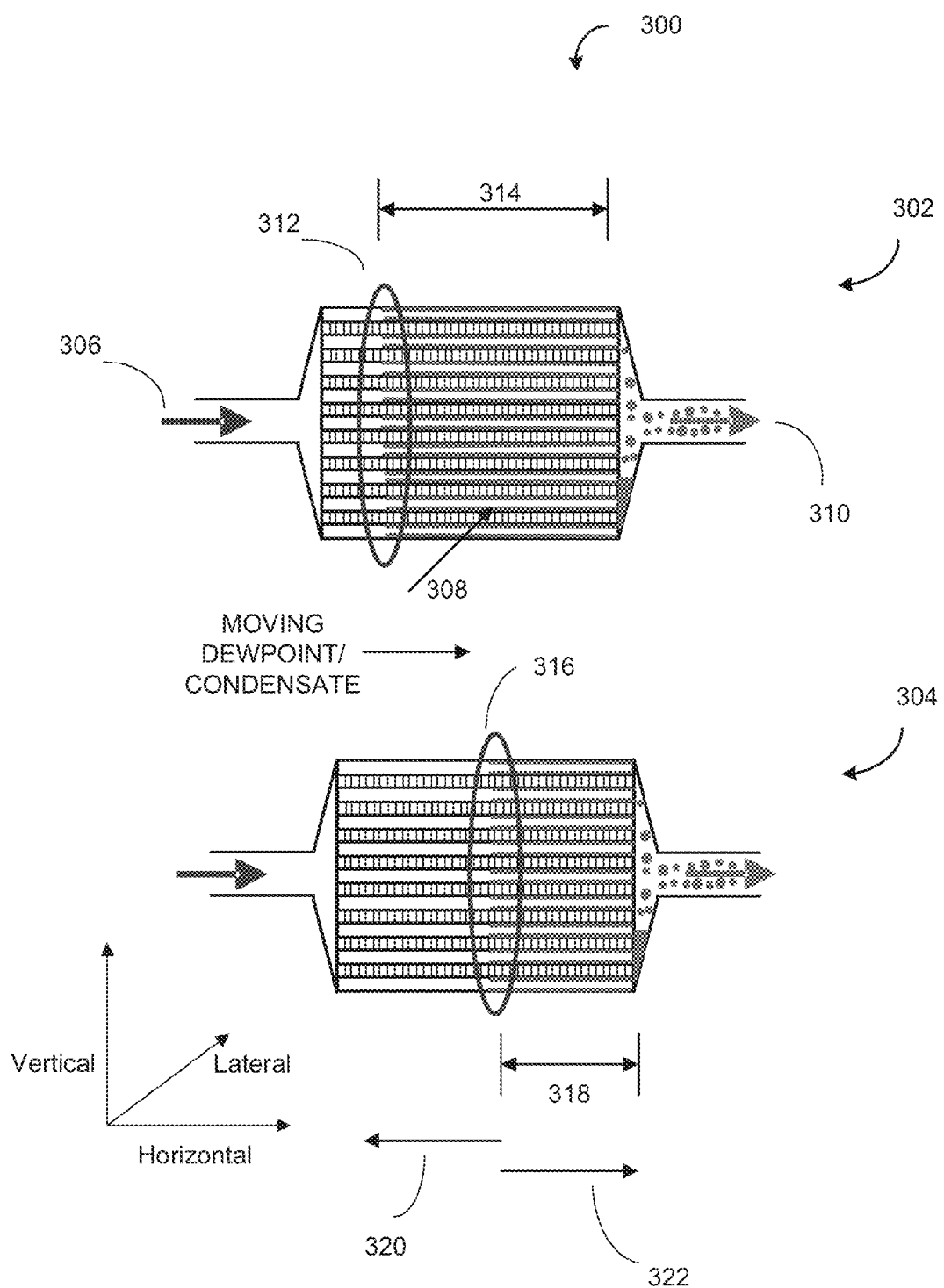
FIG. 3 shows a schematic example of the dew point location and movement within the CAC.

FIG. 2 shows an example of the CAC 18, radiator 80, engine cooling fan 92, and engine system 100 locations within a vehicle 102 with respect to the grille shutters and associated ambient air flow 116. Other under hood components (fuel system, batteries, etc.) may benefit from the cooling air flow as well. Thus, grille shutter system 110 and engine cooling fan 92 may assist cooling system 104 in cooling internal combustion engine 10. Grille shutter system 110 comprises one or more grille shutters 114 configured to adjust the amount of air flow received through grille 112.

Grille shutters 114 may cover a front region of the vehicle spanning from just below the hood to the bottom of the bumper, for example. By covering the CAC intake, drag is reduced and entry of external cooling air into the CAC is reduced. In some embodiments, all grille shutters may be moved in coordination by the controller. In other embodiments, grille shutters may be divided into sub-regions and the controller may adjust opening/closing of each region independently. For example, a first region may include grille shutters that largely affect drag while another affects entry of air into the CAC. In one example, the first sub-region may span from just below the hood to the top of the bumper, while the second sub-region may span from the top of the bumper to the bottom of the bumper. Each sub-region may contain one or more grille shutters. In some examples, each region may contain the same number of grille shutters, while in other examples one sub-region contains more than the other. In one embodiment, the first sub-region may contain multiple grille shutters, while the second sub-region contains one grille shutter. In an alternate embodiment, the first sub-region may only contain one grille shutter, while the second sub-region contains multiple grille shutters.

Grille shutters 114 are moveable between an opened position and a closed position, and may be maintained at either position or a plurality of intermediate positions thereof. In other words, opening of grille shutters 114 may be adjusted such that grille shutters 114 are opened partially, closed partially, or cycled between an opened position and a closed position to provide air flow for cooling engine compartment components at the least loss in fuel economy. This is because closing and/or partially closing grille shutters 114 reduces an amount of air flow received through grille 112, thus reducing the aerodynamic drag on the vehicle. Maintaining the grille shutters in an open position allows for sufficient engine cooling; however, this may also increase drag on the vehicle and decrease fuel economy. On the other hand, closing the grille shutters decreases drag and improves fuel economy; however, this may not allow for sufficient engine cooling. Thus, control of the grille shutters may be based on multiple vehicle operating conditions, discussed further below. In some embodiments, the grille shutters may be used for CAC condensate control only. In this case, grille shutter operation may have little to no aerodynamic benefit.

When the grille shutters are open, engine cooling fan 92 may be used to increase or decrease cooling ambient air flow 116 to engine components. For example, by increasing the engine cooling fan rotation speed, the amount and rate of air flow to the engine will increase. Conversely, by decreasing the fan rotation speed, the rate of air flow to the engine decreases. Ambient air flow velocities directly affect CAC effectiveness. Thus, by changing fan rotation speed, CAC efficiency may be altered. In some embodiments, the engine cooling fan may be a dedicated CAC fan. In other embodiments, there may be both an engine cooling fan and a dedicated CAC fan. When grille shutters are closed, little cooling ambient air flow enters the grille. However, the engine cooling fan may still operate to provide air flow. In addition to controlling rotation speed, the engine cooling fan may also change rotation direction. The blades of the fan may be designed such that rotation in a first direction directs air flow toward engine components. In the following descriptions, this will serve as the normal or base direction for fan operation. Rotation of the fan blades in a second direction, opposite the first direction, may direct air flow away from engine components. In this way, fan rotation direction may also be used to alter the cooling air flow reaching engine components and, subsequently, CAC efficiency.

In some embodiments, control system 28 may be configured to adjust opening of grille shutters 114 responsive to vehicle operating conditions. Adjusting opening of grille shutters 114 may include opening one or more of the grille shutters, closing one or more of the grille shutters, partially opening one or more of the grille shutters, partially closing one or more of the grille shutters, adjusting opening and closing timing, etc. As an example, controller 12 may be communicably connected to grille shutter system 110, and may have instructions stored thereon to adjust opening of grille shutters 114.

Control system 28 may be further configured to operate engine cooling fan 92 responsive to vehicle operating conditions. Engine cooling fan 92 operation may include increasing the fan rotation speed, decreasing the fan rotation speed, stopping the fan rotation, reversing the fan rotation direction, adjusting rotation on/off timing, etc. As an example, controller 12 may be communicably connected to engine cooling fan 92, and may have instructions stored thereon to adjust the rotation of engine cooling fan 92.

Engine cooling fan operation may be adjusted in response to a variety of system variables, including engine temperatures, vehicle driving conditions, condensate formation in the CAC, and outside weather conditions. In some embodiments, grille shutters may be adjusted in response to all or a few of these system variables. Adjustment of the engine cooling fan may be coordinated with grille shutter operation in order to optimize CAC condensate control, as well as engine cooling and fuel economy. For example, controller 12 may be communicably connected to both engine cooling fan 92 and grille shutter system 110. Controller 12 may have instructions stored thereon to adjust operation of engine cooling fan 92 or grille shutter system 110, based on the other's current condition and the above listed system variables. Operation of the engine cooling fan and grille shutters may be in response to one of these system variables, even if other variables remain within a normal range. In this way, all variables may be assessed to determine the optimal engine cooling fan rotation speed or direction, as well as grille shutter opening, for vehicle cooling, CAC corrosion prevention, misfire prevention, and increased fuel economy. Additional examples and explanation of engine cooling fan and grille shutter operation are provided in FIG. 8 and explained further below.

Under some conditions, the engine cooling fan 92 and grille shutter system 110 may be adjusted responsive to vehicle driving conditions, such as whether the vehicle is in a driven or a non-driven condition. The driven condition may include when the wheels are applying positive force propelling the vehicle forward. The non-driven condition may include when the wheels are absorbing vehicle inertia and generating a negative force against forward vehicle motion. In one embodiment, the non-driven vehicle condition may include a deceleration condition, a braking condition, a tip-out condition, a combination thereof, or another type of condition signaling that a non-driven vehicle condition is occurring, or about to occur. For example, an automatic cruise control braking signal may also be used. Further still, global positioning signals may be used to indicate a slower region ahead, a downgrade approaching, etc.

In some cases, during deceleration, the vehicle may be shut down and the transmission disconnected from the engine to improve fuel economy. In this situation, additional cooling of the engine is needed. Opening of the grille shutters and increasing engine cooling fan speed at the beginning of deceleration in this case may allow for pre-cooling of the engine, keeping engine temperatures low. This may also allow the grille shutters to remain closed for a longer period during the following driven conditions, reducing vehicle drag and again improving fuel economy.

Further, engine cooling fan 92 and grille shutter system 110 may be adjusted to alter condensate formation within the CAC 18. A plurality of sensors 30 may obtain CAC data, such as inlet and outlet pressures and temperatures. A controller 12 may use this data, along with ambient air conditions (e.g. temperature and relative or specific humidity) and vehicle data (e.g. vehicle speed), to determine the rate and the amount of condensation in the CAC. In some cases, ambient relative humidity may be calculated or assumed to be 100% at all ambient temperature conditions. This eliminates the need for a humidity sensor. However, if a humidity sensor is available, actual (e.g., real-time) humidity data may be used as well.

Controller 12 may use the sensor data described above, along with an algorithm, to calculate the amount of condensate in the CAC. The condensation calculation may begin by calculating the saturation vapor pressure at the CAC outlet as a function of the CAC outlet temperature and pressure. The algorithm then calculates the mass of water at this saturation vapor pressure. The mass of water in the air is then determined from ambient air conditions. Finally, the condensation rate at the CAC outlet is determined by subtracting the mass of water at the saturation vapor pressure condition at the CAC outlet from the mass of water in the ambient air. By determining the amount of time between condensate measurements, controller 12 may determine the amount of condensate within the CAC since the last measurement. The current condensate amount in the CAC may be calculated by adding this value to the previous condensate value and then subtracting any condensate losses since the last calculation (amount of condensate removed). Condensate losses may be assumed to be zero if the CAC outlet temperature remained above the dew point.

The controller may also track the location of the dew point within the CAC 18, as well as other corrosion risk factors (such as time at dew point at one position within the CAC). In one example, the condensation rate may be calculated and used to control the engine cooling fan and grille shutters in order to minimize condensation. In another example, the engine cooling fan and one or more grille shutters may be adjusted in response to the dew point stagnating at a specific location in the CAC for too long. By adjusting the fan and grille shutters in this way, it is possible to move the dew point to another location in the CAC 18 to reduce corrosion. For example, if the dew point has been hovering at one location in the CAC longer than a pre-determined time limit, grille shutters 114 can change position in order to alter the effectiveness of the CAC 18. Alternatively, the speed or rotation direction of the engine cooling fan may be altered, changing the effectiveness of CAC 18. In yet another example, both the grille shutter position and engine cooling fan speed or direction may be changed to alter CAC efficiency. In each case, changing the CAC effectiveness moves the dew point location. In some examples, the engine cooling fan and grille shutters are adjusted when the dew point occurs at the outlet of the CAC. In this case, the temperature of the CAC outlet air may decrease below the dew point temperature. Condensate may build up at the CAC outlet, in some cases resulting in water droplets in the air being carried into the engine. This may result in combustion issues such as misfires or slow burn. In other cases, the condensate within the CAC may freeze when the engine is shut off and exposed to freezing ambient conditions. This may cause damage to the CAC. Further illustration of engine cooling fan and grille shutter control in response to condensate formation is shown in FIG. 3 and is described below.

The position of grille shutters 114 may be further altered by current or forecasted weather conditions. For example, adjusting closing of one or more of the grille shutters 114 can be in response to condensate-forming weather conditions. Condensate-forming weather conditions may include rain, humidity, cool temperatures, or a combination thereof. The weather conditions may be provided via the in-vehicle communications and entertainment system 26 or GPS 34. Similarly, the operation of engine cooling fan 92 may be adjusted in response to current or forecasted weather conditions. For example, fan rotation may slow down or stop in response to condensate-forming weather conditions.

Further, in some embodiments, the amount of adjustment of engine cooling fan 92 and grille shutters 114 may depend on the degree of the non-driven vehicle condition, location of the dew point, or degree of condensate-forming weather conditions, and combinations thereof. For example, during greater deceleration, a degree of opening of grille shutters 114 may be increased and/or a timing of opening the grille shutters 114 may be made earlier, allowing for greater air flow to assist in cooling the engine so that subsequent acceleration with the grille shutters closed can be prolonged. In this example, the rotation speed of engine cooling fan 92 may increase to a greater degree or begin earlier, providing additional engine cooling. As another example, if the GPS 34 or in-vehicle communications and entertainment system 26 predicts a small amount of rainfall and only moderately-humid conditions, an opening of the grille shutters 114 may be reduced. In this case, fan rotation may be slowed to a degree, stopped, or possibly reversed direction.

Moreover, in some embodiments, engine cooling fan 92 and grille shutter system 110 may be adjusted based on engine temperature, a non-driven vehicle condition, and condensate formation within the CAC 18. In one example, controller 12 may be configured to monitor engine temperature, for example, monitoring a coolant temperature and comparing it to threshold values. In this example, the engine cooling fan may be turned on when engine coolant temperatures increase above a threshold. However, in some embodiments, the engine cooling fan may turn on in response to condensate formation within the CAC, even if engine coolant temperatures have not increased above the set threshold. In this way, the engine cooling fan may turn on or off in response to condensate formation in a CAC when normal fan operation in response to engine temperatures alone would have dictated the opposite fan control. Additional methods of adjusting engine cooling fan 92 and grille shutter system 110 are described in more detail with reference to FIGS. 4-6. Adjusting the fan and grille shutters in this way provides sufficient engine cooling, while reducing vehicle drag, reducing condensate formation, and avoiding stagnation of the dew point in the CAC. This may help to increase vehicle fuel economy and prevent corrosion of the CAC and engine misfire.

FIG. 3 shows a schematic example of the dew point location and movement within the CAC. Two CAC examples (302, 304) are shown at 300 with varying amounts of condensate. In the first CAC 302, hot charge air from the compressor 306 enters the CAC, cools as it travels through the CAC, and then exits CAC outlet 310 to pass though the throttle valve 20 and into the engine intake manifold 22. Ambient air flow 308 enters via the grille shutter openings and passes across the CAC, in the lateral direction, to aid in cooling the charge air. The velocity of this air flow may depend on vehicle and engine cooling fan 92 speed. The dew point location 312 is near the proximal end of the CAC (end closest to the inlet of the CAC). A highly concentrated water and acid solution may form at this point, presenting largest significant corrosion risk. Downstream of the dew point location 312, a relatively large amount of condensate 314 forms in the CAC 302. By adjusting the position of the grille shutters 114 and the rotation speed or direction of engine cooling fan 92, the ambient air flow 308 is altered, thus changing the effectiveness of the CAC and moving the location of the dew point. In the example of CAC 302, closing one or more of the grille shutters results in decreased ambient air flow 308, decreasing the cooling effectiveness of the CAC 302, and moving the dew point downstream, in the horizontal direction towards the CAC outlet and engine. Reducing the rotation speed, stopping, or reversing the rotation direction (so that it blows cooling air away from the CAC) of engine cooling fan 92 may also decrease ambient air flow 308, causing the dew point to move downstream, towards the CAC outlet and engine. The new dew point location 316 is shown in CAC 304. Charge air temperatures are warmer in this case, decreasing the amount of condensate 318 in the CAC 304.

Various approaches may be used to control the engine cooling fan and grille shutters. As described further with regard to FIG. 3, the fan and grille shutters may be adjusted based on condensate location in a CAC. For example, if the dew point location in a CAC remains within a positional range along the horizontal axis for greater than a threshold duration, then fan operation and/or grille shutter position may be adjusted to move the condensate location depending on various factors, as described herein. This positional range may be adjusted based on vehicle operating conditions. For example, if engine temperatures are high and require increased ambient air flow, then this positional range may be increased to allow for additional engine cooling. On the other hand, if the ambient air temperature is low or it is currently raining, then this positional range may be decreased to prevent corrosion of the CAC. The threshold duration described above may be an amount of time, a number of miles, a number of engine revolutions, or another measurable parameter.

With regard to FIG. 3, the control system 28 may calculate the dew point location, determine which direction it is desirable to move along the horizontal axis, and in response, adjust the engine cooling fan operation and position of the grille shutters. For example, if the dew point is to the left (upstream, closer to the CAC inlet and compressor, of the center point with respect to flow through the CAC) of a designated center position, the fan may be adjusted, grille shutters may be closed, or both, to decrease cooling and move the dew point to the right 322 (downstream with respect to flow through the CAC, closer to the CAC outlet and engine). In this case, fan adjustment may include decreasing rotation speed, stopping rotation, or reversing rotation direction so cooling air is blown away from the CAC. Conversely, if the dew point is to the right of the designated center position, fan speed is increased, grille shutters are opened, or both, to increase cooling and move the dew point to the left 320 (upstream with respect to flow through the CAC, closer to the CAC inlet and compressor). In this way, by moving the dew point to the right and causing grille shutters to open and fan speed to increase, increased engine cooling also occurs. By moving the dew point to the left and causing grille shutters to close and fan speed to decrease (or stop or change direction), vehicle drag is reduced, improving fuel economy. Thus, control of the fan and grille shutters in this way may reduce degradation of the CAC while at the same time improve fuel economy and aid in engine cooling.

Determining whether to adjust fan operation, grille shutter position, or both to change CAC efficiency may depend on other vehicle or outside conditions. For example, if the vehicle is traveling at a high speed, only opening the grille shutters may be necessary to change CAC efficiency. However, if vehicle speed is low, both opening the grille shutters and increasing fan speed may be necessary to provide enough cooling air flow to alter CAC efficiency. In another example, the dew point may need to move to the right while engine temperatures are high. In this case, cooling to the CAC may be decreased by turning off the fan. However, the grille shutters may remain open in order to still allow engine cooling.

In some embodiments, the amount of condensate or rate of condensate formation may result in engine cooling fan and/or grille shutter adjustment. For example, in regard to FIG. 3, the temperature of the air at the CAC outlet 310 may fall below the dew point temperature. In some examples, this may cause fan rotation speed to decrease and/or the grille shutters to close, reducing airflow to the CAC, thus reducing the efficiency of the CAC and increasing the temperature of the CAC outlet air. In other examples, fan speed may decrease and/or grille shutters may close after the temperature at the CAC outlet 310 location falls below the dew point for longer than a threshold duration. The threshold duration may be adjusted based on vehicle operating conditions. For example, if the vehicle speed is high, rate of condensate formation may increase, requiring a shorter threshold duration at that position. Alternatively, if the rate of condensate formation is slow, then the threshold duration at that position may be increased.

The operation of engine cooling fan 92 and grille shutter system 110 may be based on the other's current condition, along with engine temperatures, vehicle driving conditions, the amount and rate of condensate formation in the CAC, the dew point location within the CAC, and outside weather conditions. In this way, all variables may be assessed to determine the optimal combination of engine cooling fan operation and grille shutter position, for vehicle cooling, CAC corrosion prevention, misfire prevention, and increased fuel economy. Examples of this operation will be described below with regard to FIGS. 4-7.

Figure 4:
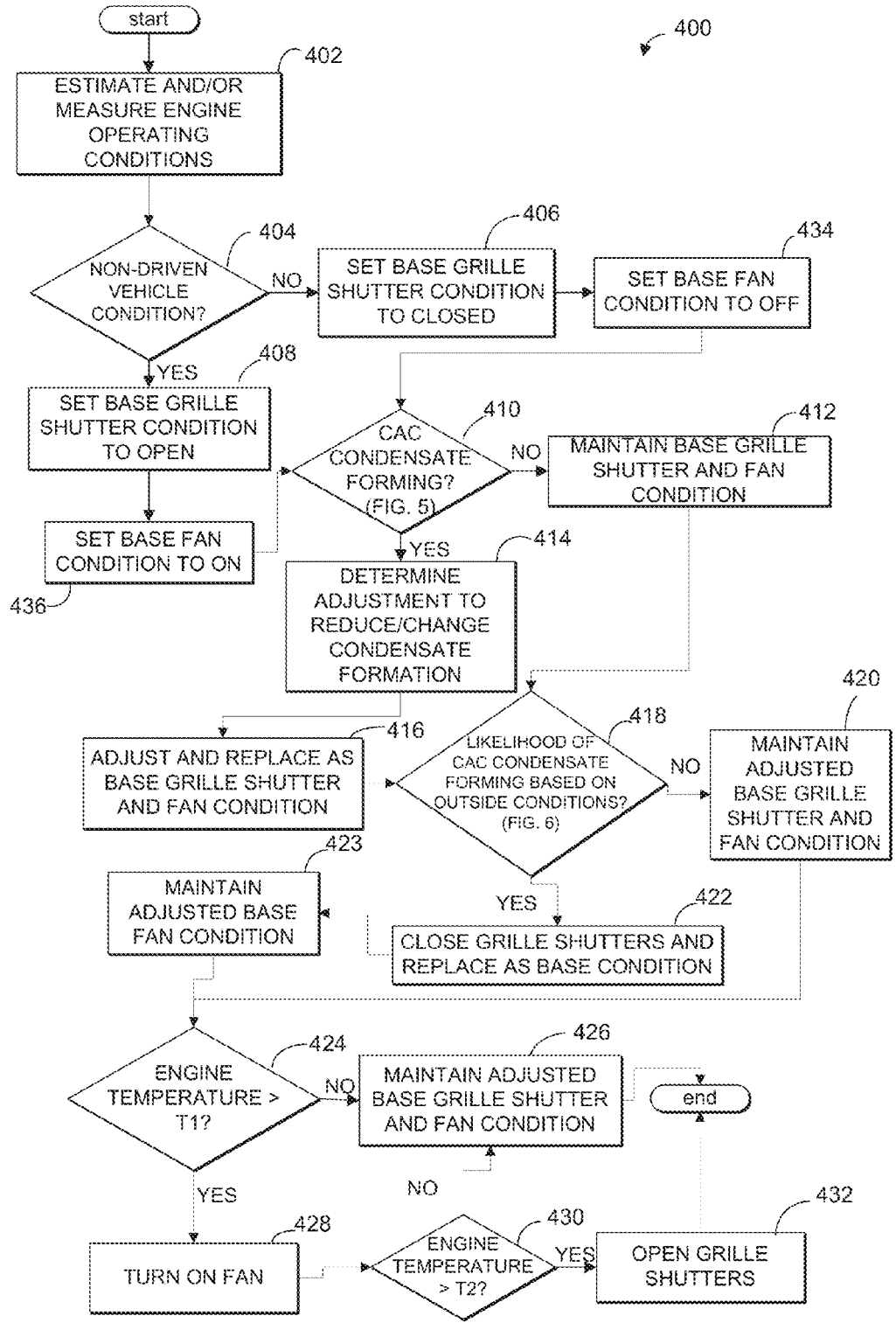
FIG. 4 shows a high level flow chart of a method for controlling an engine cooling fan and adjusting grille shutter position based on a non-driven vehicle condition, condensate formation in the CAC, outside weather conditions, and engine temperatures.

Now turning to FIG. 4, an example method 400 is shown for adjusting engine cooling fan operation and grille shutter position based on a non-driven vehicle condition, condensate formation in the CAC, outside weather conditions, and engine temperatures. At 402, the routine includes estimating and/or measuring engine operating conditions. These include, for example, engine speed and load, torque demand, boost, manifold pressure (MAP), manifold aircharge temperature (MCT), air-fuel ratio (lambda), fuel alcohol content, barometric pressure, ambient conditions (e.g., ambient air temperature, pressure, humidity, etc.), engine pre-ignition history, etc. At 404, based on the estimated conditions, it may be determined if there is a non-driven vehicle condition. Such a determination may include detecting a non-driven vehicle condition such as a deceleration condition, a braking condition, a tip-out condition, a rate of change of engine speed being less than a predetermined threshold, a braking signal from an adaptive cruise control system (that senses a distance to a vehicle directly in front of the present vehicle and automatically actuates vehicle brakes to maintain a threshold separation from the preceding vehicle), or another type of condition signaling a non-driven vehicle condition. As an example, the non-driven vehicle condition may be when the depression amount of the driver's braking pedal is greater than a threshold value. As another example, the non-driven vehicle condition may be when the driver's braking effort (e.g., a force on the braking pedal) is greater than a threshold value. As yet another example, the non-driven vehicle condition may be when the brake pressure is greater than a threshold value. As even another example, the non-driven vehicle condition may be when the actuation degree of the vehicle brakes (e.g., electrically actuated brakes) is greater than a threshold value.

If the vehicle does not have a non-driven vehicle condition (e.g., the vehicle is being driven), then method 400 proceeds to 406 and 434 where the controller sets the base grille shutter condition to closed and the base fan condition to off, respectively. However, if the vehicle does have a non-driven vehicle condition, then method 400 proceeds to 408 and 436 where the controller sets the base grille shutter condition to open and the base fan condition to on. The speed of the fan may also be adjusted at this point, depending on the non-driven condition. For example, the fan speed may be higher for larger degrees of deceleration. From both 434 and 436, method 400 continues to 410 where condensate formation in the CAC is assessed. This method is expanded upon in FIG. 5, discussed below. If it is determined at 410 that condensate is not forming, then method 400 proceeds to 412 to maintain grille shutter position and fan operation at their base conditions. However, if it is determined at 410 that condensate is forming, method 400 proceeds to 414 to determine the adjustment to the grille shutters and/or fan required to reduce or change condensate formation. At 416, this adjustment is made and the new conditions are set as the base grille shutter and fan conditions.

The routine at 418 determines the likelihood that condensate will form in the CAC, based on outside weather conditions. This method is expanded upon in FIG. 6, explained further below. If, based on weather conditions, it is not likely for CAC condensate to form, the grille shutters and fan are maintained at the adjusted base condition. However, if condensate is likely to form, the grille shutters are closed, replacing the old base condition. The base fan condition may be maintained. Method 400 continues on to 424 to check engine temperatures in relation to threshold values. For example, if the engine coolant temperature (ECT) increases above a maximum value, engine cooling assistance is required. If these temperatures are not above a threshold value (T1), then grille shutter position and fan operation are maintained at their adjusted base conditions and the routine ends. However, if temperatures are above a first threshold value, T1, the fan is turned on. Engine temperatures are checked again at 430. If temperatures are above a second threshold value, T2, the grille shutters are opened and the routine ends. Otherwise, the fan remains on and the adjusted base grille shutter position is maintained. In some embodiments, the second threshold value is greater than the first threshold value. In other embodiments, the first and second threshold values may be the same.

An example method 500 is shown in FIG. 5 for adjusting engine cooling fan operation and grille shutter position based on condensate formation within the CAC. At 502, the routine determines the conditions of the CAC. This may include retrieving details such as ambient air temperature, ambient air humidity, inlet and outlet charge air temperature, and inlet and outlet charge air pressure from a plurality of sensors 30. These variables are used at 504 to determine if condensate is forming in the CAC. If condensate is not forming, the method maintains the current fan control and grille shutter condition at 506 and then ends. However, if condensate is forming, the method continues to 508 to determine the dew point location within the CAC. The controller 12 may determine dew point location by analyzing the conditions of the CAC, as described above, as well as other variables (such as vehicle speed, fan speed, grille shutter position, etc.). The controller may use algorithms to analyze data and determine the location of the dew point, the amount of time the dew point has stayed at that position (e.g., a residence time), the amount of condensate within the CAC, and other values. If the time at the dew point is not over a set time limit at 510, then the method maintains the current fan control and grille shutter condition at 512 and then ends. However, if the time at the dew point is over a set time limit (or threshold duration), at 510, then the method at 514 determines which direction the dew point is to be moved, such as a desired location (as described above and illustrated in FIG. 3). At 516, the controller 12 and actuators 32 adjust the fan operation and grille shutter orientation to move the dew point to the desired location. After the fan and grille shutters have been adjusted, the routine ends.

Turning to FIG. 6, an example method 600 is shown for adjusting grille shutter position based on condensate forming conditions determined from outside weather conditions. At 602, the controller 12 receives data from a plurality of sensors 30, a GPS 34, and the in-vehicle communications and entertainment system 26. The retrieved data may include ambient air temperature and humidity and forecasted weather conditions for the road ahead or along the vehicle's trip plan. The controller 12 then analyzes the data for CAC condensation formation conditions at 604. These conditions may include rain, high humidity, low air temperature, or a combination thereof. If it is determined at 606 that condensate forming conditions are above threshold values, then grille shutters are closed at 610. Otherwise, the method maintains the current grille shutter position at 608. Threshold values may include a threshold temperature, humidity percentage, or precipitation amount in which condensate is likely to form within the CAC. After 610 and 608, the routine ends. If engine temperatures increase over threshold values during condensate-forming weather conditions, the engine cooling fan may be turned on to provide engine cooling while still preventing condensate formation in the CAC.

Figure 7A:
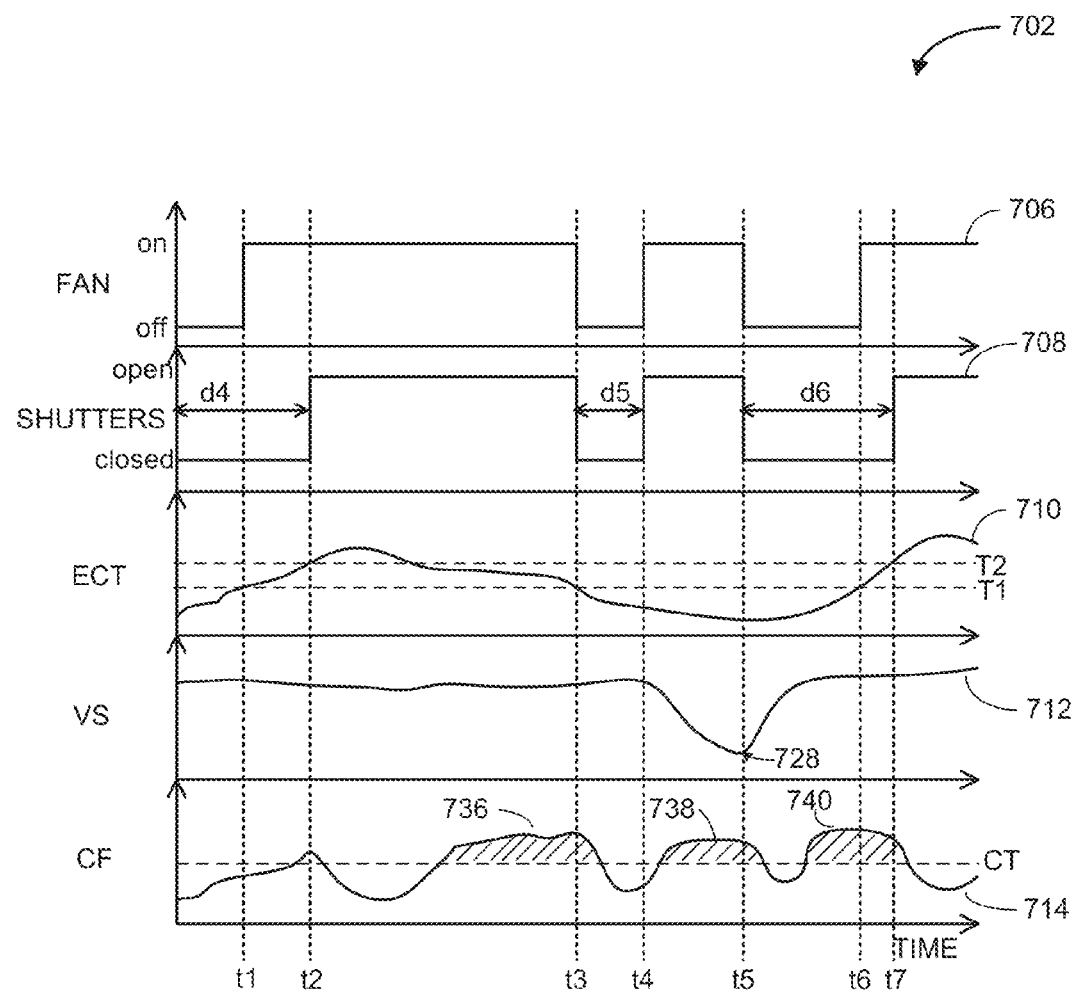
FIG. 7A shows a graphical example comparison of engine cooling fan and grille shutter operation due to engine coolant temperature and vehicle speed, independent of condensate formation.
Figure 7B:
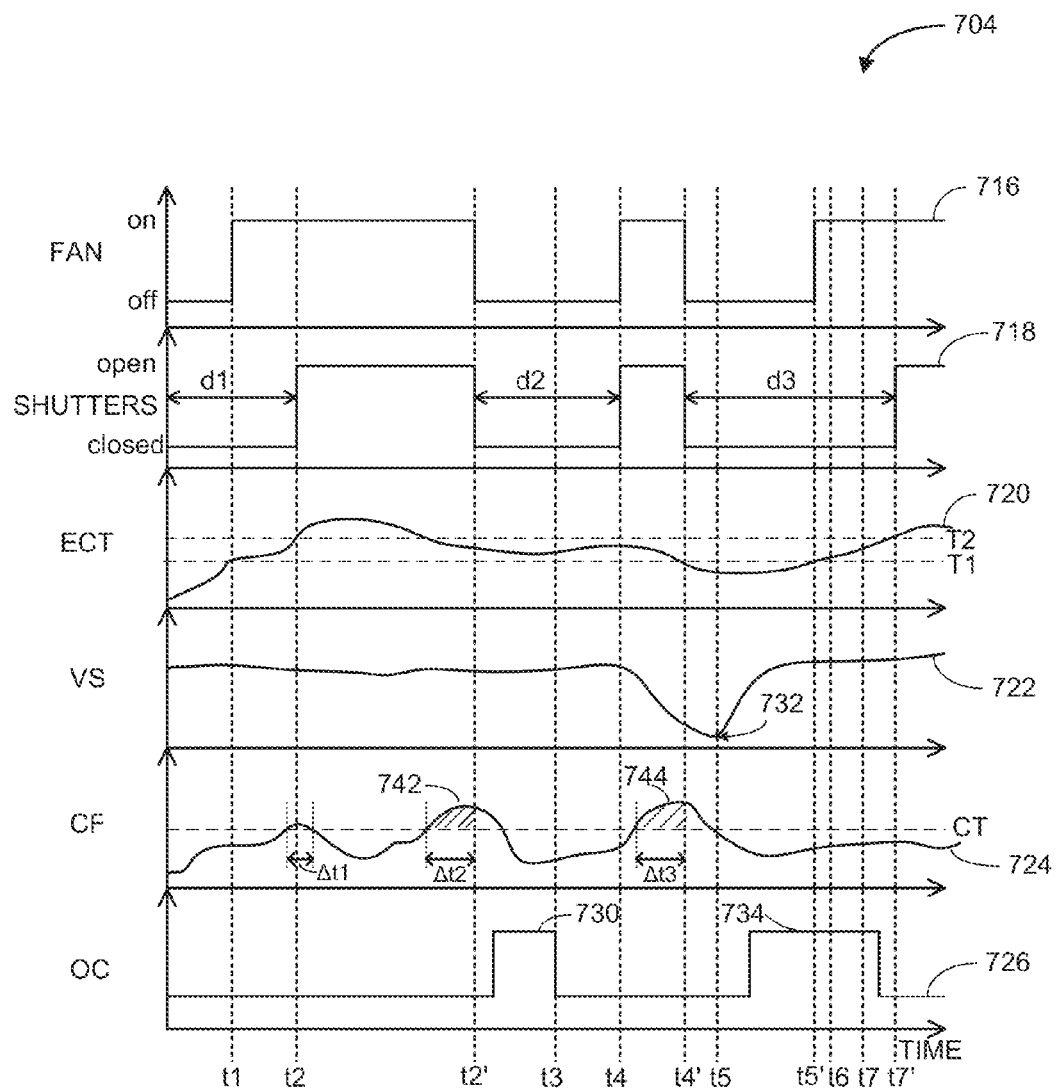
FIG. 7B shows a graphical example comparison of engine cooling fan and grille shutter operation due to engine coolant temperature, vehicle speed, condensate formation, and outside weather conditions.

FIGS. 7A and 7B show example graphs 702, 704 comparing engine cooling fan and grille shutter operation due to engine coolant temperature, vehicle speed, condensate formation, and outside weather conditions. The example graphs 702 and 704 compare adjustments to cooling system components at varying combinations of vehicle speed (VS) and outside weather conditions (OC) as a function of time (along the x-axis). Graph 702 illustrates a first example operation of an engine cooling fan and grille shutters independent of condensate formation (CF). Engine cooling fan on/off and opening and closing of the grille shutters is based on engine temperature and a non-driven vehicle condition, represented in this figure as an engine coolant temperature (ECT) and vehicle speed (VS), respectively. Graph 702 includes engine cooling fan status (on or off) at plot 706, grille shutter status (open or close) at plot 708, changes in engine coolant temperature (ECT) at plot 710, changes in vehicle speed (VS) at plot 712, and changes in condensate formation (CF) at plot 714.

Graph 704 illustrates a second example of an adjustable engine cooling fan and grille shutter system wherein operating these systems is based on engine coolant temperature, vehicle deceleration, condensate formation, and outside weather conditions. Graph 704 includes engine cooling fan status (on or off) at plot 716, grille shutter status (open or close) at plot 718, ECT at plot 720, VS at plot 722, CF at plot 724, and an indication of outside weather conditions (OC) at plot 726. In this example, the engine cooling fan and grille shutters are turned on/off and opened/closed, respectively, in response to system and outside variables. However, in some embodiments, fan and shutter control may include adjustments between the on/off and open/closed positions, respectively. In this case, the engine cooling fan speed and degree of grille shutter opening may be adjusted by the system variables shown in graphs 702 and 704. For example, engine cooling fan speed may increase (e.g., proportionally) as ECT increases above a threshold. In another example, engine cooling fan speed may change for different degrees of deceleration or different amounts of condensate formation in the CAC.

With regard to graph 702, prior to t1, the cooling fan may not be operating. At time t1, in response to ECT reaching a threshold temperature T1 (plot 710), the engine cooling fan is turned on (plot 706). Condensate forming (CF) at the charge air cooler may be monitored. Condensate formation (plot 714) reaches a threshold (CT) just before time t2. This threshold CT corresponds to a threshold above which accumulation of condensate can increase risk for corrosion. However, at the same time, the engine coolant temperature (plot 710) exceeds a threshold value T2 (higher than threshold T1), causing the grille shutters to open (plot 708). The combination of the open grille shutters and rotation of the engine cooling fan provides increased ambient air flow which helps to decrease ECT and changes the effectiveness of the CAC. In particular, this causes condensate formation to decrease below the threshold (CT) before corrosion risk conditions are reached (plot 714). While the fan stays on and the shutters remain open, to reduce the ECT temperature, condensate formation increases again above the threshold CT (plot 714). At time t3, the engine coolant temperature falls below threshold value T1 (plot 710), in response to which the fan is turned off and the grille shutters are closed. At time t4, the vehicle speed indicates a vehicle deceleration or vehicle braking condition (plot 712), triggering opening of the grille shutters and turning on of the engine cooling fan. During this time, the engine coolant temperature drops further and condensate formation again rises above the threshold CT. At time t5, the vehicle accelerates, and due to increased condensate formation, the engine misfires at 728. As the vehicle continues to accelerate, engine coolant temperature increases, along with condensate formation. Engine coolant temperature reaches T1 at time t6, causing the fan to be turned on. Shortly thereafter at time t7, the grille shutters open when the engine coolant temperature reaches T2.

With regard to graph 704, the engine cooling fan again turns on at time t1 (plot 716) when ECT reaches T1 (plot 720). Condensate formation increases above threshold CT (plot 724) just before t2 for time duration Δt1, which is less than the set time limit. Grille shutters then open (plot 718) when the engine coolant temperature exceeds the threshold value T2 at time t2 (plot 720). As time goes on, condensate formation increases above threshold CT (plot 724). The fan stays on and shutters remain open until time t2', when the CF curve has remained above CT for the set time limit, Δt2 (plot 724). The fan turns off and grille shutters close at t2', allowing condensate formation to decrease again. Note that the fan turns off and grille shutters close at t2' due to condensate formation, even though engine coolant temperatures have not fallen below T1. Between t2' and t3, the outside weather conditions change to that which will likely form condensate (plot 726). Since the grille shutters are already closed, they remain closed at 730. Grille shutters open again at time t4, in response to vehicle deceleration (plot 722), and remain open until t4'. The fan also turns on during this time. At time t4', the fan turns off (plot 716) and grille shutters close again (plot 718) in response to the CF curve increasing above CT for the set time limit, Δt3 (plot 724). The grille shutters remain closed at time t5 when the vehicle accelerates (plot 722). It is important to note that engine misfire does not occur at 732 in this example since condensate within the CAC was kept low due to earlier changes in the fan and grille shutter conditions. Grille shutters remain closed until t7' due to condensate-forming weather conditions 734. The fan turns on at t5' when engine coolant temperature increases above T1 (plot 720). Grille shutters stay closed until t7' when engine coolant temperature increases to T2 (plot 720).

In comparing graphs 702 and 704, differences in condensate formation within the CAC are seen. The CF curve (plot 714) increases above the condensate threshold four times in graph 702, three of which present significant corrosion risk to the CAC (736, 738, and 740). However, in graph 704, the time the CF curve (plot 724) spends above the condensate threshold CT is reduced (742 and 744). Thus, controlling the engine cooling fan and grille shutters in response to condensate formation and outside weather conditions reduces the risk of corrosion and condensate formation within the CAC. The grille shutters also spend more time closed in graph 704 (duration d1, d2, and d3) than in graph 702 (duration d4, d5, and d6). This reduces the aerodynamic drag on the vehicle, improving fuel economy.

Figure 8:
FIG. 8 shows four modes of operation for the engine cooling fan and grille shutters.

Turning now to FIG. 8, four modes for coordinated operation of the engine cooling fan and grille shutters of an engine cooling system are shown in table 800. The engine cooling system may operate in four basic modes, based on a non-driven vehicle condition, condensate formation in the CAC, outside weather conditions, and engine temperatures. In each of the cooling system modes, the engine cooling fan may be turned on or off and the grille shutters may be actuated open or closed in response to the listed conditions and system variables. For example, the engine cooling system may be operated in a first mode (mode 1). During operation in the first mode (mode 1), the engine cooling fan is actuated on and the grille shutters are actuated open. In one example, the engine cooling system may be operated in mode 1 in response to one or more of engine coolant temperatures being above a higher threshold temperature (such as above second threshold temperature T2 as referenced in FIGS. 4 and 7), the dew point in the CAC needing to be moved towards the inlet of the CAC, and a non-driven vehicle operating condition, such as deceleration. As another example, the engine cooling system may be operated in a second mode (mode 2). During operation in mode 2, the engine cooling fan may be turned on and the grille shutters may be actuated closed. In one example, the engine cooling system may be operated in mode 2 in response to one or more of engine coolant temperatures being above a lower threshold temperature (such as above first threshold temperature T1, as referenced in FIGS. 4 and 7), during a vehicle tip-in or acceleration condition, and during condensate-forming ambient conditions such as rain. For example, if it is raining but engine coolant temperatures are above T1, the fan and grille shutters may be operated in mode 2. In another example, operation in mode 2 may be triggered if the dew point needs to move towards the inlet of the CAC, but only by a small amount (e.g., by a distance that is smaller than a threshold amount).

The engine cooling system may be further operated in a third mode (Mode 3). During operation in the third mode, the engine cooling fan may be actuated off while the grille shutters are actuated open. In one example, operation in mode 3 may be initiated in response to a non-driven vehicle condition such as deceleration. In another example, operation in mode 3 may be triggered if less cooling is needed to change the CAC efficiency, such as to move the dew point towards the CAC inlet by a small amount. Finally, the engine cooling system may be operated in a fourth mode (mode 4) wherein the engine cooling fan is actuated off and the grille shutters are actuated closed. In one example, operation in mode 4 may be initiated in response to a tip-in or acceleration condition, during condensate-forming conditions such as rain, or if the dew point in the CAC needs to be moved towards the CAC outlet. For example, if engine coolant temperatures are less than threshold temperature T1 and the vehicle is accelerating, the fan and grille shutters may be operated in mode 4. In another example, if the engine coolant temperatures are less than threshold T1 and it is raining outside, the fan and grille shutter operation may be operated in mode 4. A controller (such as control system 28 of FIG. 1), may select a mode of operation for the engine cooling system, including settings for the engine cooling fan and grille shutters, to optimize engine cooling, vehicle aerodynamics, and condensate management.

In this way, engine cooling fan operations may be controlled in response to engine temperatures, vehicle driving conditions, condensate formation in the CAC, and outside weather conditions. By adjusting engine cooling fan operations in coordination with grille shutter operations, condensate accumulation at a charge air cooler can be better controlled, improving engine cooling and fuel economy. By selectively increasing an engine cooling fan speed, engine system components may be cooled while a dew point within the CAC is moved towards the CAC inlet. Grille shutters may also be concurrently opened to assist in cooling by further increasing ambient air flow. During other conditions, grille shutters may be closed, limiting an amount of cooling air flow directed towards a CAC, enabling a dew point in the CAC to be moved towards a CAC outlet. In addition, engine cooling fan operation may to adjusted to change the effectiveness of the CAC by moving a dew point within the CAC. Controlling an engine cooling fan and grille shutters in this way allows for adequate engine cooling, while optimizing vehicle fuel economy, preventing engine misfire, and preventing CAC corrosion.

As will be appreciated by one of ordinary skill in the art, routines described herein may represent one or more of any number of engine cooling fan or grille shutter adjustment controls. As such, various steps or functions illustrated may be performed in the sequence illustrated, in parallel, or in some cases omitted. Likewise, the order of control is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for controlling an engine cooling fan, comprising:
adjusting engine cooling fan operation in response to condensate formation within a charge air cooler, where adjusting engine cooling fan operation includes:
determining an amount of condensate formation within the charge air cooler based on one or more of charge air cooler inlet and outlet charge air pressure, charge air cooler inlet and outlet charge air temperature, ambient conditions, and vehicle speed, and adjusting engine cooling fan operation based on the determined amount of condensate formation, where the determining is performed by a controller; and
determining a condensate location within the charge air cooler based on one or more of charge air cooler inlet and outlet charge air pressure, charge air cooler inlet and outlet charge air temperature, ambient conditions, vehicle speed, fan speed, and grille shutter position, and adjusting engine cooling fan operation based on the determined condensate location.

2. A method for controlling an engine cooling fan, comprising:
adjusting engine cooling fan operation in response to condensate formation within a charge air cooler, where adjusting engine cooling fan operation includes:
determining an amount of condensate formation within the charge air cooler based on one or more of charge air cooler inlet and outlet charge air pressure, charge air cooler inlet and outlet charge air temperature, ambient conditions, and vehicle speed, and adjusting engine cooling fan operation based on the determined amount of condensate formation, where the determining is performed by a controller; and
changing a fan rotation direction of the engine cooling fan to change an effectiveness of the charge air cooler and move a condensate location within the charge air cooler.

3. A method for controlling an engine cooling fan, comprising:
determining a condensate location within a charge air cooler (CAC) along a horizontal axis of the CAC; and
adjusting both engine cooling fan operation and a grille shutter position in response to the determined condensate location within the CAC remaining within a positional range for greater than a threshold duration.

4. The method of claim 3 wherein the engine cooling fan is adjusted to move the condensate location within the CAC toward an inlet of the CAC during a first set of conditions, and to move the condensate location within the CAC toward an outlet of the CAC during a second, different, set of conditions.

5. The method of claim 4 wherein the first set of conditions includes when the condensate location is closer to the outlet than the inlet.

6. The method of claim 4 wherein the first set of conditions includes when the condensate location is closer to the inlet than the outlet.

7. The method of claim 4 wherein the first set of conditions includes when engine temperature is higher than a threshold and the second set of conditions includes when the engine temperature is lower than the threshold, and wherein the engine temperature is an engine coolant temperature.

8. The method of claim 4 wherein moving the condensate location toward the inlet includes increasing fan speed, and moving toward the outlet includes reducing fan speed.

9. The method of claim 4 wherein the first set of conditions includes when a driver tip-out occurs, and the second set of conditions includes engine-driven vehicle acceleration.

10. The method of claim 3 further comprising adjusting the engine cooling fan in response to engine cooling parameters and a driver pedal tip-out.

11. The method of claim 9 wherein the positional range is increased in response to increased engine temperature.

12. The method of claim 9 further comprising boosting intake air upstream of the CAC.

13. The method of claim 3 further comprising directly injecting fuel into an engine of a vehicle and wherein the determining the condensate location within the CAC is performed by a controller including computer readable instructions for adjusting engine cooling fan operation based on the determined condensate location.

14. A method for controlling a vehicle engine cooling fan, comprising:
increasing engine cooling fan speed in response to a condensate-forming location within a charge air cooler (CAC), and engine temperature above a threshold or vehicle deceleration conditions;
decreasing engine cooling fan speed in response to the condensate-forming location within the CAC, and engine temperature below the threshold;

determining a position of the condensate-forming location within the CAC and adjusting engine cooling fan speed based on the determined position; and adjusting a grille shutter in response to the determined position of the condensate-forming location in the CAC.

15. A method for controlling a vehicle engine cooling fan, comprising:

adjusting engine cooling fan operation in response to a condensate location within a charge air cooler remaining stagnant for greater than a threshold duration, including increasing engine cooling fan speed in response to a first condition, and decreasing engine cooling fan speed in response to a second condition different from the first condition; and determining the condensate location within the charge air cooler has remained stagnant for greater than a threshold duration with an engine controller based on one or more of inlet and outlet charge air pressure and temperatures of the charge air cooler, ambient conditions, and vehicle speed, wherein adjusting engine cooling fan operation includes adjusting engine cooling fan operation based on the determination that the condensate location within the charge air cooler has remained stagnant for greater than the threshold duration, and wherein engine cooling fan operation is adjusted to move the condensate location within the charge air cooler toward an inlet of the charge air cooler during the first condition, and to move the condensate location toward an outlet of the charge air cooler during the second condition, the first condition including when the condensate location in the charge air cooler is closer to the outlet of the charge air cooler than the inlet of the charge air cooler and the second condition including when the condensate location in the charge air cooler is closer to the inlet of the charge air cooler than the outlet of the charge air cooler.

16. The method of claim 15 further comprising adjusting engine cooling fan operation in response to engine cooling parameters and a driver pedal tip-out and tip-in, wherein a positional range is increased in response to increased engine temperature.

17. A method for controlling a vehicle engine cooling fan, comprising:

adjusting engine cooling fan operation in response to a condensate location within a charge air cooler remaining stagnant for greater than a threshold duration, including increasing engine cooling fan speed in response to a first condition, and decreasing engine cooling fan speed in response to a second condition different from the first condition, where the condensate location within the charge air cooler is a dew point location along a horizontal axis of the charge air cooler, and where the dew point location is determined by an engine controller based on one or more of a charge air cooler inlet and outlet charge air pressure, charge air cooler inlet and outlet temperature, ambient conditions, vehicle speed, fan speed, and grille shutter position.

18. A method for controlling a vehicle engine cooling fan, comprising:

adjusting engine cooling fan operation in response to a condensate location within a charge air cooler remaining stagnant along a horizontal axis of the charge air cooler for greater than a threshold duration, including increasing engine cooling fan speed in response to a first condition, and decreasing engine cooling fan speed in response to a second condition different from the first condition.

19. A method for controlling a vehicle engine cooling fan, comprising:

adjusting engine cooling fan operation in response to a condensate location within a charge air cooler remaining stagnant for greater than a threshold duration, including increasing engine cooling fan speed in response to a first condition, and decreasing engine cooling fan speed in response to a second condition different from the first condition, where the first condition includes the condensate location being located closer to an outlet than an inlet of the charge air cooler and the second condition includes the condensate location being located closer to the inlet than the outlet.

* * * * *